(12) United States Patent
Dannenbring

(10) Patent No.: US 9,978,274 B2
(45) Date of Patent: *May 22, 2018

(54) NEGATIVE IMAGE FOR SIGN PLACEMENT DETECTION

(71) Applicant: HERE Global B.V., Eindhoven (NL)

(72) Inventor: Aaron J. Dannenbring, Chicago, IL (US)

(73) Assignee: HERE Global B.V., Eindhoven (NL)

(*) Notice: Subject to any disclaimer, the term of this patent is extended or adjusted under 35 U.S.C. 154(b) by 0 days. days.

This patent is subject to a terminal disclaimer.

(21) Appl. No.: 15/353,904

(22) Filed: Nov. 17, 2016

(65) Prior Publication Data
US 2017/0069206 A1 Mar. 9, 2017

Related U.S. Application Data

(63) Continuation of application No. 14/524,606, filed on Oct. 27, 2014, now Pat. No. 9,530,313.

(51) Int. Cl.
G08G 1/09 (2006.01)
G08G 1/0962 (2006.01)
(Continued)

(52) U.S. Cl.
CPC ......... *G08G 1/09623* (2013.01); *G01C 21/32* (2013.01); *G01C 21/3602* (2013.01);
(Continued)

(58) Field of Classification Search
CPC ........... G06K 9/00818; G06K 9/00798; G06K 9/00825; G06K 9/00791; G06K 9/6256;
(Continued)

(56) References Cited

U.S. PATENT DOCUMENTS 6,405,128 B1  6/2002  Bechtolsheim et al.
6,472,977 B1  10/2002  Pochmuller
(Continued)

FOREIGN PATENT DOCUMENTS

DE   102012110595 A1   5/2014
EP       1327969 A1   7/2003
(Continued)

OTHER PUBLICATIONS

European Search Report and Written Opinion cited in EP15189868.1, dated Mar. 22, 2016.
(Continued)

*Primary Examiner* — Thomas Mullen
(74) *Attorney, Agent, or Firm* — Lempia Summerfield Katz LLC

(57) ABSTRACT

Systems, methods, and apparatuses are described for a negative image or false positive profile for sign locations. Image data or another type of optical data is collected along a path by a collection device such as a camera. The data is analyzed to identify one or more false positive locations along the path at which signs for other paths may be detected. The false positive locations may be described in the negative image or false positive profile. Additional or subsequent optical data may be analyzed based on the negative image or false positive profile may be analyzed to identify at least one confirmed sign position.

20 Claims, 13 Drawing Sheets

(51) Int. Cl.
*G08G 1/0967* (2006.01)
*G01C 21/32* (2006.01)
*G06F 17/30* (2006.01)
*G06K 9/00* (2006.01)
*G01C 21/36* (2006.01)
*G06K 9/62* (2006.01)

(52) U.S. Cl.
CPC ... *G01C 21/3697* (2013.01); *G06F 17/30241* (2013.01); *G06K 9/00791* (2013.01); *G06K 9/00818* (2013.01); *G06K 9/6256* (2013.01); *G08G 1/09626* (2013.01); *G08G 1/096783* (2013.01)

(58) Field of Classification Search
CPC .............. G06F 17/30241; G01C 21/32; G01C 21/3602; G01C 21/3697; G08G 1/096783; G08G 1/09623; G08G 1/09626
USPC ........... 340/905, 903, 435; 382/103; 701/28; 348/148
See application file for complete search history.

(56) References Cited

U.S. PATENT DOCUMENTS

| | | |
|---|---|---|
| 7,433,889 B1 | 10/2008 | Barton |
| 8,009,061 B2 | 8/2011 | Denaro |
| 8,996,228 B1 | 3/2015 | Ferguson et al. |
| 9,092,695 B1 | 7/2015 | Ogale |
| 9,530,313 B2 * | 12/2016 | Dannenbring ......... G01C 21/32 |
| 2009/0074249 A1 | 3/2009 | Moed et al. |
| 2009/0312888 A1 | 12/2009 | Sickert et al. |
| 2010/0328462 A1 | 12/2010 | Chen |
| 2011/0109476 A1 | 5/2011 | Porikli et al. |
| 2012/0150428 A1 | 6/2012 | Niem et al. |
| 2013/0034261 A1 | 2/2013 | Perlin et al. |
| 2013/0049988 A1 | 2/2013 | Roeber et al. |
| 2013/0096731 A1 | 4/2013 | Tamari et al. |
| 2014/0193033 A1 | 7/2014 | Huth |
| 2015/0220795 A1 | 8/2015 | Fischer et al. |

FOREIGN PATENT DOCUMENTS

| | | |
|---|---|---|
| JP | 2008287379 A | 11/2008 |
| WO | WO2008118578 A2 | 10/2008 |
| WO | WO2009098154 A1 | 8/2009 |

OTHER PUBLICATIONS

European Office Action for European Patent Application No. 15189868.1-1203, dated Apr. 12, 2018.

* cited by examiner

NEGATIVE IMAGE FOR SIGN PLACEMENT DETECTION

CROSS-REFERENCE TO RELATED APPLICATION

This application is a continuation under 35 U.S.C § 120 and 37 C.F.R. § 1.53(b) of U.S. patent application Ser. No. 14/524,606 (now U.S. Pat. No. 9,530,313) filed Oct. 27, 2014, the disclosure of which is incorporated herein by reference in its entirety.

FIELD

The following disclosure relates to sign identification, or more particularly, identification and prevention of false positives in sign identification.

BACKGROUND

Nearly all roadways are posted with physical speed limit signs. The speed limits may be set according to a wide variety of rules and by different entities. Countries or states may set speed limits for interstates or major highways, and municipalities such as cities and towns may set speed limits for smaller roads and streets. The speed limits may be selected under rules based on the curvature or lane width of the road. The speed limits may be selected under rules based on the proximity to urban or rural areas. Other considerations such as school zones, bridges, or pedestrian crossings may impact the selection of speed limits. Because of these variable situations, it may not be possible to reliably identify the speed limit of a road from the placement of the road or shape of the road on the map. Instead, posted speed limits are detected in order to identify speed limits of roads on the map. Other indicia or road postings may be similarly inconsistent.

Once speed limits or other indicia or road postings are detected, the data may be associated with the appropriate road link. Because of variances in sign locations, this may not be a straightforward process. Challenges remain in reliably associating correct sign values with their respective road links.

SUMMARY

In one embodiment, optical data collected along a path by a collection device is received at a computing device. From the optical data, one or more false positive locations along the path are identified. The optical data is further analyzed as a function of the one or more false positive locations to locate at least one confirmed sign position in the optical data. In some embodiments, a false positive profile is generated based on the false positive locations along the path. The false positive profile may be associated with a link corresponding to the path on which the optical data was collected.

BRIEF DESCRIPTION OF THE DRAWINGS

Exemplary embodiments are described herein with reference to the following drawings.

DETAILED DESCRIPTION

A road sign may be defined as a physical object conveying information to those traveling on or near a road. Signs may be posted on existing posts or utility poles, individually mounted on poles adjacent to the road, mounted on walls or other building alongside the road, mounted on overpasses, or supported by overhead gantries. Signs intended for one road may be posted within a line of sight for another road. The cameras or other sensors on a vehicle traveling on one road may be able to detect signs intended for another road.

The proximity of adjacent roads may cause false positives in sign detection. A false positive for sign detection is when a sign is detected for a location but no sign exists at that location, or the sign that does exist belongs to another road or path. For example, consider a highway with a parallel access road that runs alongside the highway. Signs for the access road may be detected by a vehicle traveling on the highway, and signs for the highway may be detected by a vehicle traveling on the access road. In another example, signs for a roadway may be detected from vehicles traveling on an overpass, or signs for the overpass may be detected from vehicles traveling on the lower roadway. Signs from a ramp may be detected from a main roadway, and vice versa. Similar scenarios are possible in many types of intersections.

When a sign is detected from a nearby roadway, data from the sign may be associated with the wrong roadway. Such incorrect detections or associations may be referred to as false positives. When false positives are stored, users may be given incorrect guidance or other information. For example, when a speed limit sign is associated with the wrong roadway, the roadway may be assigned a speed limit that is too low. Accordingly, a navigation device may issue incorrect speed warnings when the vehicle is actually not exceeding the real speed limit. In addition, the navigation device may redirect a user based on the incorrect speed limit. The incorrect speed limit may cause the route to appear slower than it really is, and an alternative road may be selected when the original roadway would have been the best route.

The following embodiments provide systems and methods for the identification of false positives in sign detection and algorithms to determine when the correct sign is detected. Data is collected over a selection of one or more roadways and by one or multiple vehicles equipped with cameras or other sensors to detect the signs. A negative image or false positive profile for a road link may be generated. The negative image indicates locations of known or potential false positive locations. For subsequent detection of road signs, the negative image may instruct the camera or other sensor to ignore particular areas or remove particular detected sign locations from the detection results.

Overview

Figure 1:
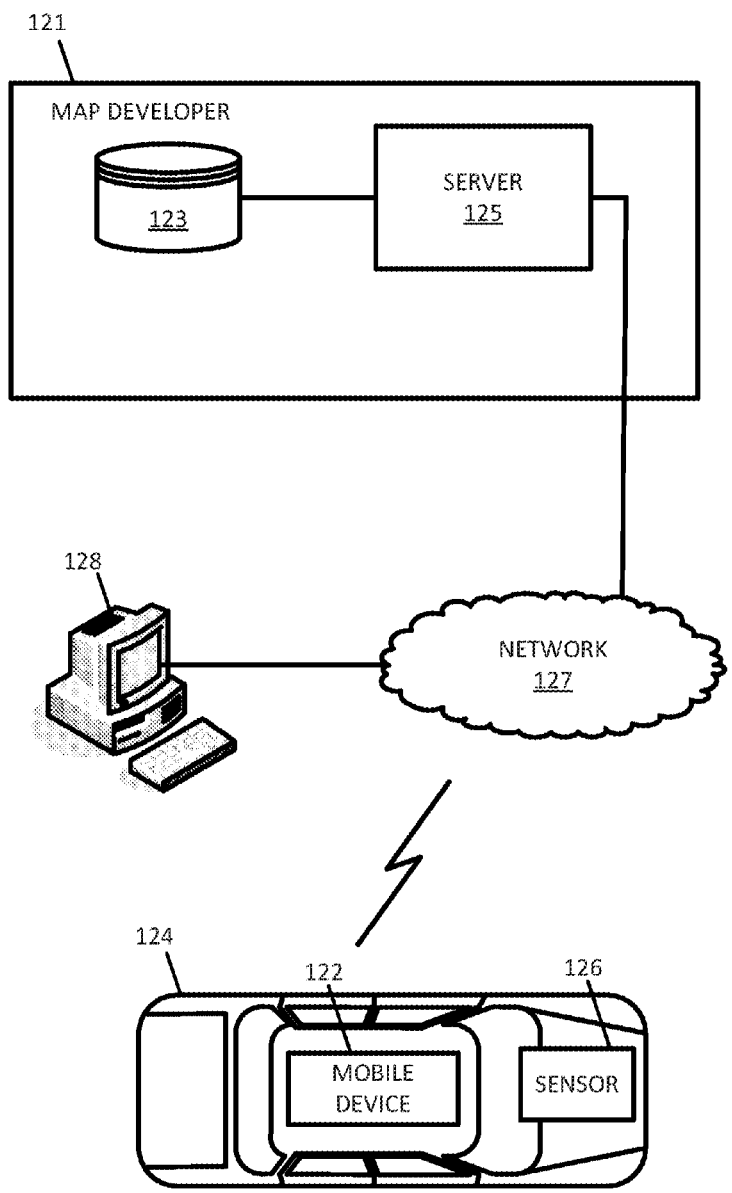
FIG. 1 illustrates an example system for determining sign placement false positives.

FIG. 1 illustrates an example system 120 for identification of false positives in sign detection data collected by one or more vehicles 124. The system 120 includes a developer system 121, one or more mobile devices 122, a workstation 128, and a network 127. Additional, different, or fewer components may be provided. For example, many mobile devices 122 and/or workstations 128 connect with the network 127. The developer system 121 includes a server 125 and one or more databases. The database 123 may include probe data or data collected from one or more vehicles 124, which may include both historical and real time data. The database 123 may be a geographic database including road links or segments. In one embodiment, the system 120 may determine positions for false positives. In another embodiment, the system 120 may apply the false positives to subsequent detected sign locations.

The database 123 may store or maintain geographic data such as, for example, road segment or link data records and node data records. The link data records are links or segments representing the roads, streets, or paths. The node data records are end points (e.g., intersections) corresponding to the respective links or segments of the road segment data records. The road link data records and the node data records may represent, for example, road networks used by vehicles, cars, and/or other entities.

The mobile device 122 may receive optical data collected along one or more paths by a collection device such as sensor 126. The sensor 126 may be a camera or another optical sensor such as a light detection and ranging (LIDAR) device. The mobile device 122 may send the optical data to the server 125, and the server 125 receives the optical data through network 127.

Either the mobile device 122 or the server 125 may process the optical data. For example, either device may identify one or more false positive locations along the path. The false positive location for a road sign may be a location that is detected for the road sign but does not actually include a road sign. For example, when another object such as a tree or building is incorrectly identified as a road sign. The false positive location for a road sign may be a label or attribute for a road sign that is associated with a road segment or link but should not be associated with that road segment or link. For example, when a road sign for a nearby road can be detected from one or more other roads.

The false positive locations may be identified through visual inspection. That is, a user may look at the optical data and determine whether a particular sign should be associated with the path of the vehicle 124. Other techniques, such as computer vision or learned model approaches may be used. In one example, a user of the mobile device 122 is prompted upon the collection of the optical data to identify whether a sign depicted in the optical data should be recorded as a sign location or dismissed as a false positive.

The location of the identified false positive location may be stored in the database 123. The location may be stored as a set of coordinates. The location may be stored in association with the link upon which the optical data was collected. In one example, the mobile device 122 generates location data from position circuitry (e.g., global positioning system (GPS)). The current road link may be selected from the database 123. The identified false positive may be stored for the current road link in the database 123.

Another vehicle 124 including another mobile device 122 may subsequently collect optical data. The mobile device 122 may send location data indicating the same road link that is associated with a false positive sign location. The mobile device 122 or the server 125 may analyze subsequently collected optical data in light of the false positive sign location. For example, the mobile device 122 or server 125 may ignore portions of the optical data that correspond to the false positive sign location. The mobile device 122 or server 125 may identify an actual sign position in other portions of the optical data. Additional embodiments and details are discussed below.

The mobile device 122 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include relational database service devices, mobile phone devices, or car navigation devices.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The computing resources may be divided between the server 125 and the mobile device 122. In some embodiments, the server 125 performs a majority of the processing for calculating the vehicle confidence value and the comparison with the confidence threshold. In other embodiments, the mobile device 122 or the workstation 128 performs a majority of the processing. Alternatively, the processing is divided substantially evenly between the server 125 and the mobile device 122 or workstation 128.

Example Path and Sign Arrangements

Figure 2:
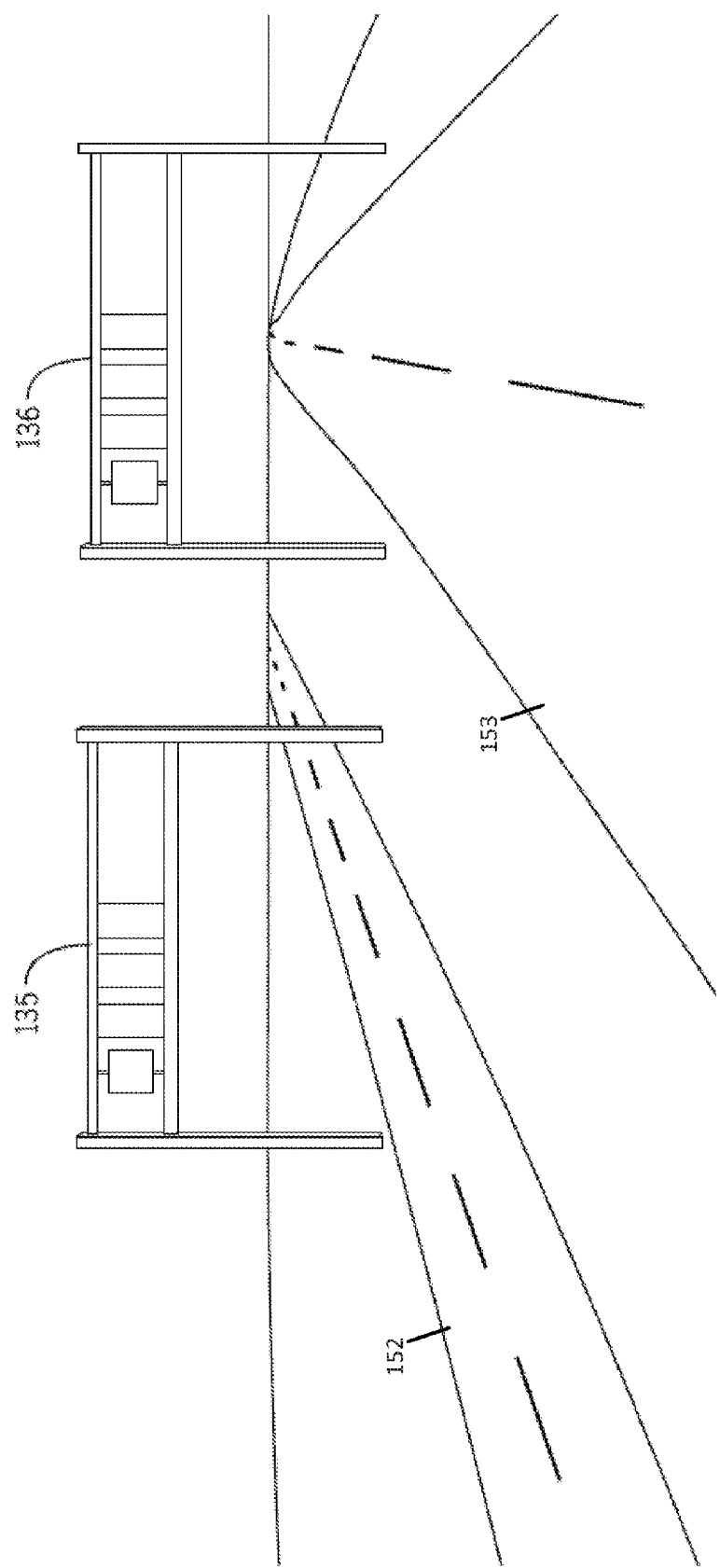
FIG. 2 illustrates an example set of roadways with potential false positives for sign placement.
Figure 3:
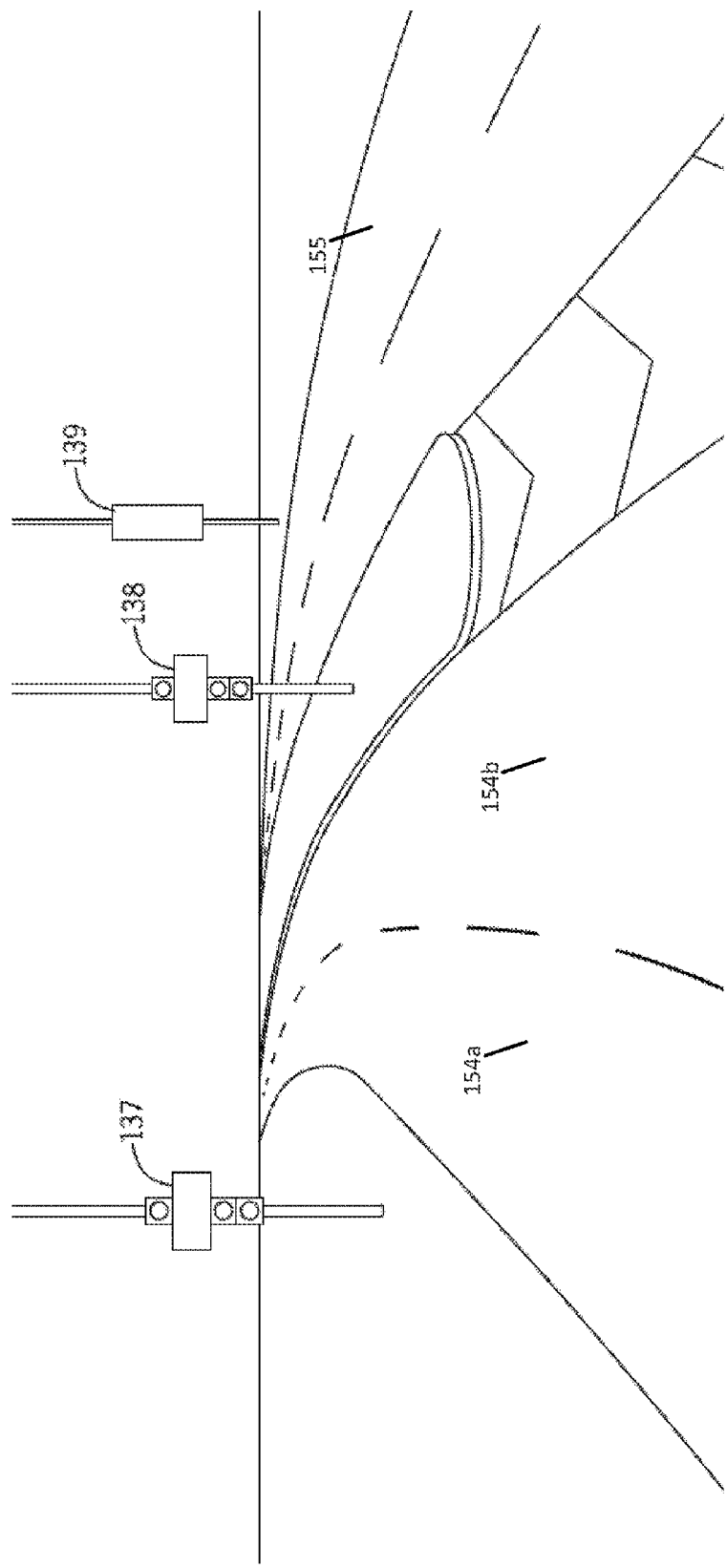
FIG. 3 illustrates another example set of roadways with potential false positives for sign placement.
Figure 4:
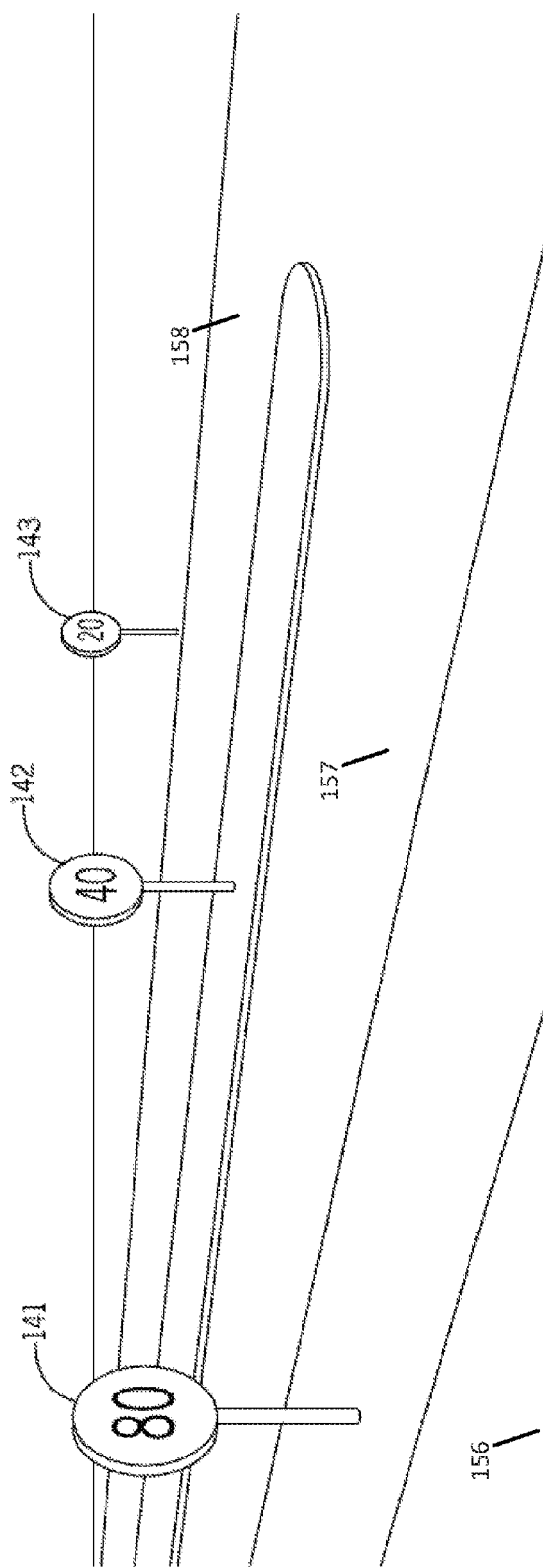
FIG. 4 illustrates another example set of roadways with potential false positives for sign placement.

FIGS. 2, 3, and 4 illustrate example sets of roadways with potential false positives for sign placement. The images of FIGS. 2, 3, and 4 may correspond to the optical data describing one or more road signs as collected terrestrially by a camera on vehicle 124. The term terrestrial image may refer to those images taken from the ground or near the ground (i.e., not aerial images or satellite images). Alternatively, any embodiment described herein may be applied to aerial images or satellite images. Rather than roadways, other types of paths may be used such as pedestrian paths, bike paths, waterways, airways, train paths, moving walkways or other paths.

FIG. 2 illustrates an example where multiple roads traveling in the same direction are adjacent and parallel. The term adjacent may be defined as within a distance range. The distance range may be within the detection capabilities of sensor 126. The distance range may be a function of the focal length of the camera. The distance range may be a function of the range of a LIDAR device. The distance range may be configurable. Example distance ranges may be 10 meters, 100 feet or another value.

FIG. 2 illustrates that a vehicle traveling on left road 152 may be within viewing range or detection range of sign 135 intended for left road 152 and also sign 136 intended for right road 153. Likewise, a vehicle traveling on right road 153 may be within viewing range or detection range of sign 136 intended for right road 153 and also sign 135 intended for left road 152. When building a false positive profile for left road 152, the server 125 may identify a false positive location at sign 136, and when building a false positive profile for right road 153, the server 125 may identify a false positive location at sign 135. Accordingly, when implementing the false positive profile, the location of sign 136 may be ignored for left road 152 and the location of sign 135 may be ignored for right road 153.

FIG. 3 illustrates that a vehicle traveling on left lane 154*a* may be within viewing range or detection range of sign 137 intended for the left lane 154*b* but also within range of sign 138 intended for right lane 154*a* and sign 139 intended for exit ramp 155. Similarly, a vehicle traveling on right lane 154*b* may mistakenly detect signs 137 and 139 intended for other vehicles, and a vehicle traveling on exit ramp 155 may mistakenly detect signs 137 and 138 intended for other vehicles. The server 125 may identify false positive locations for left lane 154*a* at the locations of signs 138 and 139. The server 125 may identify false positive locations for right lane 154*b* at the locations of signs 137 and 139. The server 125 may identify false positive locations for exit ramp 155 at the locations of signs 137 and 138. The false positive locations may be ignored when subsequently analyzing optical data for sign locations.

FIG. 4 illustrates another example where multiple signs may be detectable from a single point. Sign 141 should be associated with road link 156, sign 143 should be associated with road link 157, and sign 142 should be associated with road link 158. However, vehicles on road link 156 may be able to detect signs 142 and 143. Accordingly, the mobile device 122 or server 125 may identify false positive locations for each road link, and analyze subsequent optical data taking into consideration the identified false positive locations.

The units for the speed limit signs may be in kilometers per hour, miles per hour, meters per second, or other units. Some of the signs are illustrated as speed limit signs but other types of signs are possible. The other signs may be any type of sign that instructs a driver and could result in a change in the operation of the vehicle. The other types of signs may include curve warnings, road identification signs, navigational signs (e.g., distance to location A or turn here for location A), passing zones, yield signs, stop signs, bus stops, crosswalk signs, taxi stand, school zones, jail zones, high occupancy vehicle signs, express lane signs (e.g., directional or operation status), exit signs, parking signs, exclusionary signs, traffic signs, closure signs, toll signs, street or road identification signs, or another type of sign with alphanumeric and/or graphical indicia.

False Positive Profile or Negative Image Generation

The negative image may be a false positive profile or a set of data that describes the locations of one or more false positives. The false positive profile may list road links paired with false positive locations. The false positive profile may be stored in a lookup table in a memory (e.g., database 123, a memory of mobile device 122, or a memory of server 125). An example association of road link identifiers and false positive locations is shown in Table 1. In some circumstances, a single false positive location may be associated with multiple road links.

TABLE 1

| Road Link | False Positive(s) |
|---|---|
| A4352 | $(X_1, Y_1)$ |
| B2635 | $(X_2, Y_2), (X_3, Y_3)$ |
| B3487 | $(X_3, Y_3), (X_4, Y_4)$ |

Figure 5:
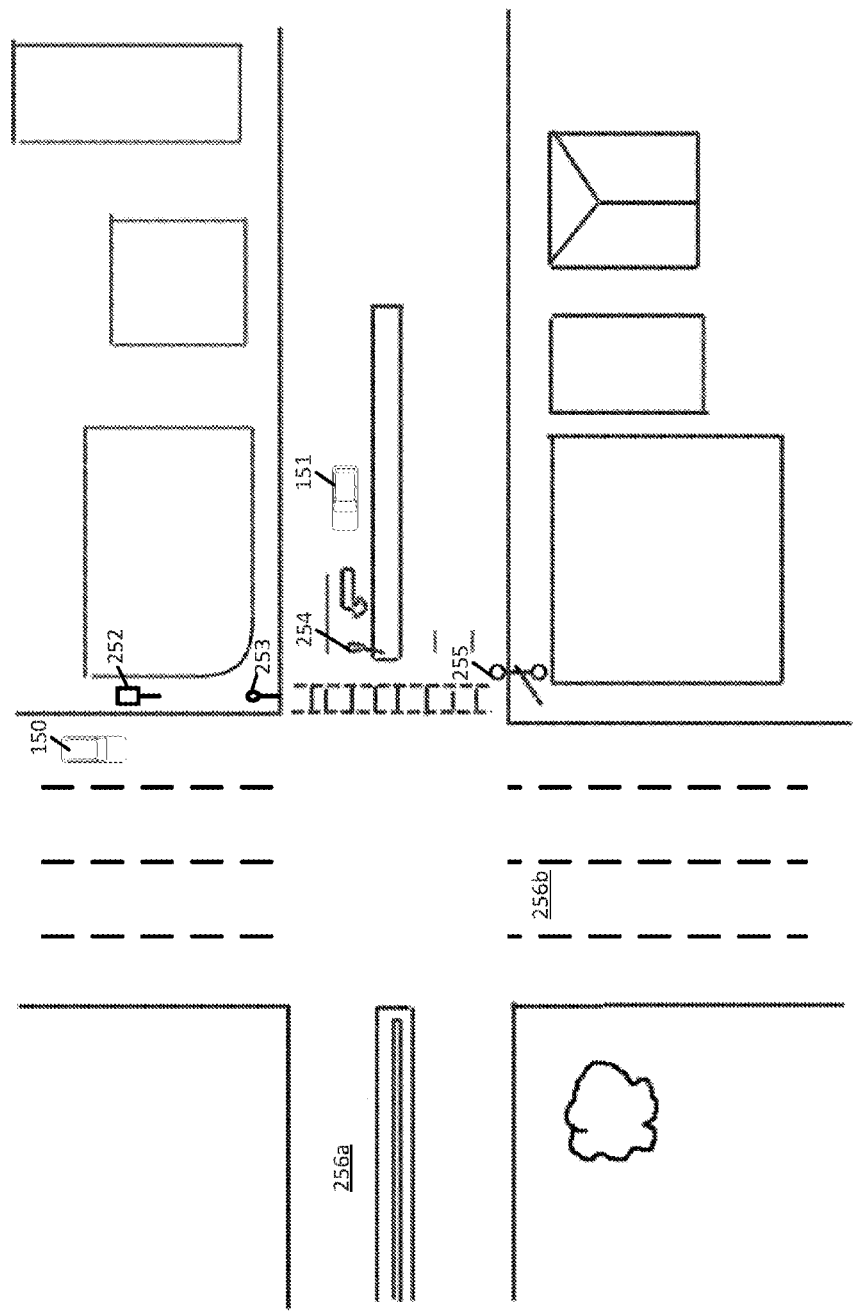
FIG. 5 illustrates an overhead view of an example set of roadways with potential false positives for sign placement.

FIG. 5 illustrates an overhead view of an example set of roadways with potential false positives for sign placement. A first roadway (road link) 256*a* runs left to right, and a second roadway (road link) 256*b* runs up and down. A first vehicle 151 travelling on the road link 256*a* may detect signs 253, 254, and 255. A second vehicle 150 traveling on the road link 256*b* may detect signs 252, 253, 254, and 255.

Either or both of the vehicles may traverse the roadways and collect optical data or images for building the false positive profile. The false positive profile may be built using a variety of techniques. False positives for any link may be identified in collected optical data based on one or a combination of (1) visual inspection, (2) crowdsourcing, (3) computer aided analysis, (4) statistical analysis, or (5) inference from adjacent links.

The optical data may be visually inspected. A user (e.g., technician or map developer) may inspect image data (e.g., FIGS. 2-4) and determine which of the signs should be associated with the road link that the image was collected from. The general placement of the road link that the image was collected from may be inferred from the perspective and angle of the image. The user may click a check box or touch signs that should be associated with another road link.

The visual inspection may be performed using a crowdsourcing application. For example, the image data including sign data may be sent using network 127 (e.g., the Internet) to a plurality of other users. The users may inspect the image and determine which of the signs should be associated with the road link that the image was collected from. In one example, the same image is sent to multiple other users to increase the confidence level of the result. The users may vote and the condition (e.g., whether a particular sign is a false positive) receiving the most votes is selected. Alternatively, different users may be sent different images. The users may receive an incentive (e.g., a coupon or monetary compensation) to inspect the image data for false positive sign locations.

The false positives may be identified with computer aided analysis. For example, the optical data may be analyzed using a computer vision application. The computer vision application may include one or a combination of edge detection, feature matching, object recognition, or motion analysis. The computer vision application may identify potential signs in the optical data based on the shape and size of the signs. The server 125 may compare a set of template images to the optical data. The set of template images may include common sizes and shapes for road signs.

The computer vision application may determine a distance from the road link and a placement angle with respect to the road link where the sign occurs in the optical data. The computer vision application may determine an orientation angle of the sign. The identification of false positives may be based on the distance, placement angle, or orientation of the signs. For example, signs at greater than a threshold distance from the road link may be designated as false positives for the road link. In another example, signs of a certain size that have a placement angle greater than a threshold may be designated as false positives for the road link. Finally, signs at an orientation within a predetermined range may be designated as false positives for the road link. Associated signs should be at an orientation nearly perpendicular to the road link. False positive signs may have an orientation at an angle less than a minimum or more than a maximum angle from the road link. An example range from the minimum angle to the maximum angle may be 40 to 140 degrees. Other orientation ranges are possible.

One alternative to the computer vision application for determining the placement and distance of the signs may be LIDAR or another distancing technology (e.g., RADAR, structured light). In one example, the signs are painted with a reflective paint or retroreflective paint. The extra reflectivity may distinguish the signs from other objects in the optical data. The area of reflectivity may be easily measured to determine the placement and distance of the signs. The resolution or accuracy of the distance of the signs using this technique may be about 1 centimeter.

The false positives may be identified using a statistical analysis. For example, in the case of speed limit signs, the road link may be associated with speed limit values. When a new sign for a speed limit is collected for the road link, the new speed limit may be compared to previous speed limit values. For example, when a difference between the new speed limit and the historical speed limit values is more than a predetermined threshold, the new speed limit is designated as a false positive. Example predetermined thresholds include 30 miles per hour, 50 kilometers per hour, or 50% of the value of the historical speed limit values. When multiple data points exist for speed limits for a road link, false positives may be designated when new data points exceed a predetermined number of standard deviations from the average values.

False positives may also be associated with a confidence level, which may also be stored in the lookup table and/or database 123. The confidence level may be a probability, percentage, or decimal value that describes how likely the false positive is in fact a location of a sign that should not be associated with the current road link. The confidence value may be a function of the distance or placement of the detected sign. Multiple threshold values may be used. For example, when the sign is a first distance from the road link, the sign is designated as a false positive with low confidence, and when the sign is a second distance (greater than the first distance) from the road link, the sign is designated as a false positive with high confidence. Multiple distances and confidence levels may be used. Similarly, the orientation of the sign may be compared to multiple thresholds corresponding to confidence levels.

Implementation of the False Positive Profile

Figure 6:
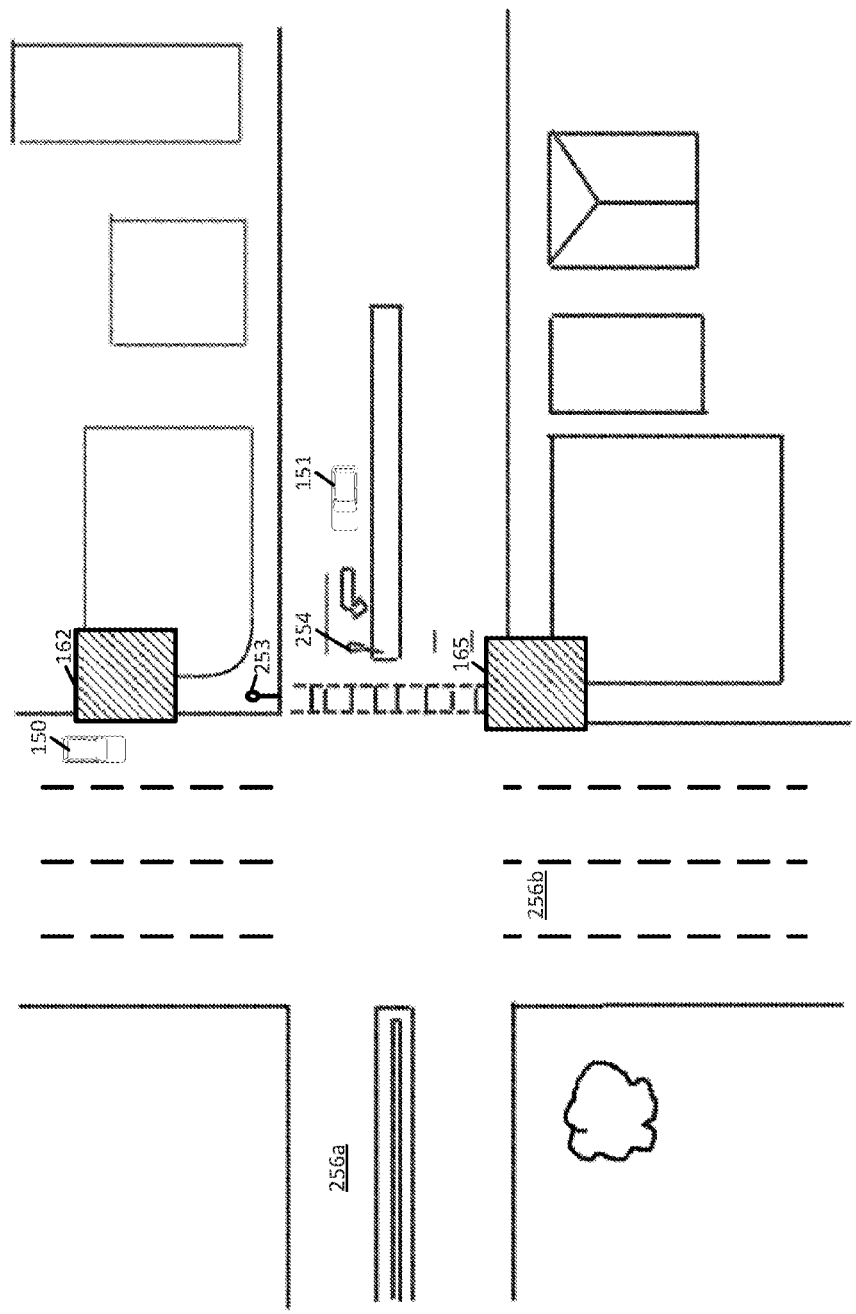
FIG. 6 illustrates an example bounding box for the potential false positives of FIG. 5.

FIG. 6 illustrates example bounding boxes for the potential false positives of FIG. 5. A bounding box is a blackout region or ignored region in the optical data. The bounding box may be defined in a place or a three-dimensional space. The bounding box may be in a plane perpendicular to the direction of the path, in a plane perpendicular to the line of sight of the camera or other sensor, or in a plane parallel to the ground. The bounding box may be rectangular, a rectangular prism, a circle, a sphere, or another shape. The size of the bounding box may be configurable. The size of the bounding box may be set based on the size of the sign, based on the capabilities of the sensor 126, the speed that the optical data was collected, or based on the functional classification of the road link.

FIG. 6 illustrates an example bounding boxes for the vehicle 151 traveling on road link 256a. Bounding box 162 is located around the false positive sign location 252 (shown in FIG. 5), and bounding box 165 is located around the false positive sign location 255 (shown in FIG. 5). The server 125 or the mobile device 122 may be configured to translate the optical data taken from multiple positions and the bounding box to the same coordinate system. A single bounding box may be applied to multiple images.

When subsequent optical data is received at the server 125 or the mobile device 122, the false positive profile may be implemented by (1) blocking analysis within the bounding box, (2) subjecting data associated with the bounding box to higher scrutiny, or (3) issuing a warning to a developer or user indicating the risk of a false positive.

Analysis on the optical data may be blocked based on the bounding box. In one example, data within the bounding box is purged or removed from the set of optical or image data. Signs may be identified outside of the bounding box based on any of the algorithms described above (e.g., computer vision). In another example, after a sign is detected in the optical data, the location of the sign is compared to the bounding boxes to determine if the detected sign is within the bounding box and is likely a false positive.

The bounding box boundaries are illustrations of thresholds. The bounding boxes may be stored numerically as coordinates of vertices of the bounding box. When a distance between the potential sign position and a closest of the one or more false positive locations exceeds a threshold corresponding to the size of the bounding box, the potential sign position may be designated as a confirmed sign position. When the distance between the potential sign position and the closest of the one or more false positive locations is less than the threshold corresponding to the size of the bounding box, the potential sign position may be deleted or removed from consideration.

The optical data or image data corresponding to the bounding box may be subjected to higher scrutiny. For example, any signs detected using a computer vision application within a bounding box may be submitted for further visual inspection (manual analysis) by a human user or more computationally intensive computer inspection. In another example, a second computer analysis is performed on detected signs in the bounding box.

The server 125 or mobile device 122 may generate and issue a warning to a developer or other user indicating the risk of a false positive. When signs are detected in the bounding box, a message is generated informing the user that there's a risk of a false positive. The message may also include the confidence level.

Assisted Driving Platforms

Figure 7:
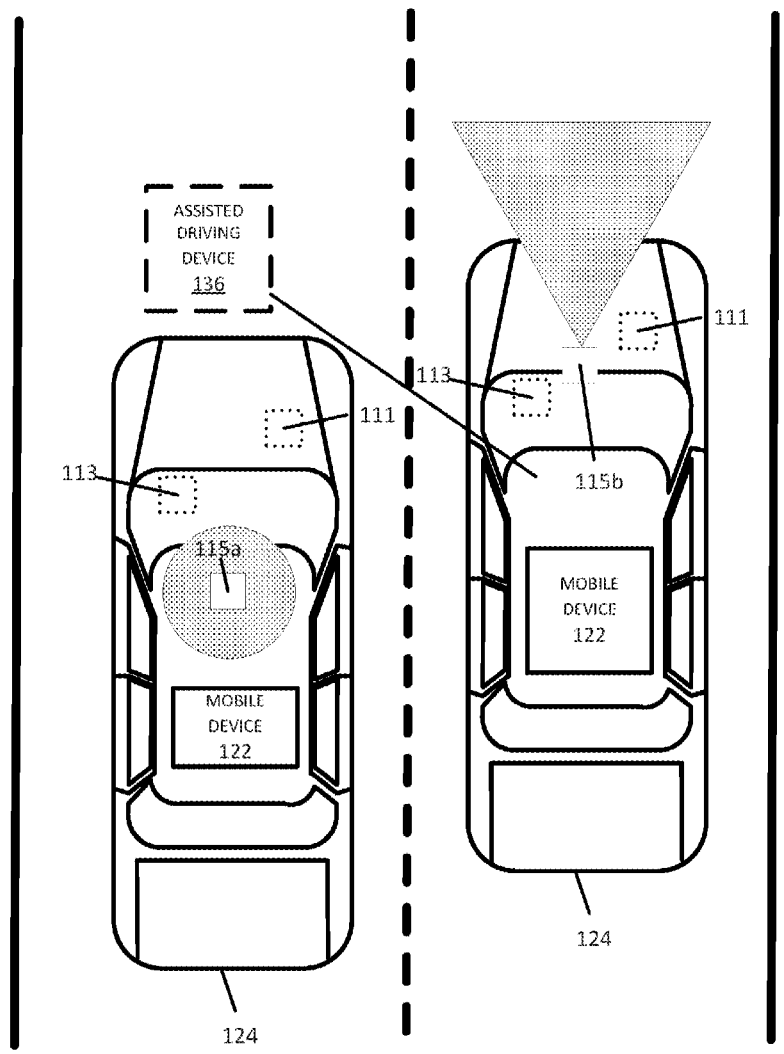
FIG. 7 illustrates example vehicles for determining potential false positives.

FIG. 7 illustrates example vehicles 124 for determining potential false positives. The vehicles 124 may be assisted driving vehicles. Assisted driving vehicles include autonomous vehicles, highly assisted driving (HAD), and advanced driving assistance systems (ADAS). Any of these assisted driving systems may be incorporated into mobile device 122. Alternatively, an assisted driving device 136 may be included in the vehicle 124. The assisted driving device may include memory, a processor, and systems to communicate with the mobile device 122.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. Autonomous vehicles may set a speed for the vehicle based on speed limit values from the database 123 or speed limit values detected by sensor 126. Other commands may be generated based on other types of signs.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. Autonomous vehicles may adjust a speed for the vehicle based on speed limit values from the database 123 or speed limit values detected by sensor 126. Other commands may be generated based on other types of signs.

Similarly, ADAS vehicles include one or more partially automated systems in which the vehicle alerts the driver. The features are design to avoid collisions automatically. Features may include adaptive cruise control, automate braking, traffic warnings, alerts for drivers of other cars, danger alerts, warnings to keep the driver in the correct lane, or blind spot warnings. ADAS vehicles may issue a speed warning for the vehicle based on speed limit values from the database 123 or speed limit values detected by sensor 126 and the current speed of the vehicle. Other commands may be generated based on other types of signs.

In one example, the mobile device 122 or the assisted driving device receives speed data (e.g., based on GPS) for the vehicle 124. The speed data is compared to the speed value read from one or more signs that are not included in the false positive profile. When the current speed data exceeds the detected speed value, a speed warning is issued. The speed warning may indicate to the user that the speed limit is exceeded. Alternative, a speed reduction command may be generated that automatically causes the vehicle 124 to brake or decrease the throttle.

Autonomous vehicles, HAD vehicles, or ADAS vehicle may be used to collect the optical data for building the false positive profiles. In addition, any of these types of vehicle may be controlled based on the false positive profiles and subsequently collected data. For example, the vehicles may collect images of road signs and analyze the road signs on the fly. The analysis may be based on any of the embodiments herein. The vehicles may automatically change the speed of the vehicle, make turns, select a new route, or other driving features based on the analysis.

The vehicles 124 may be equipped with a mobile device 122 and a sensor array including one or a combination of a vehicle sensor 113, an environment sensor 111, and a camera 115. One example camera 115a is mounted on the top of the vehicle and has a 360 degree field of view, and another type of camera 115b is mounted on a front, rear, or side of the vehicle 124 and has a wide angle view less than a 360 field of view. The mobile device 122 may be a personal device such as a mobile phone equipped with position circuitry (e.g., global positioning system (GPS)) and an inertial measurement unit (IMU). The mobile device 122 may be a specialized device (e.g., not a mobile phone) mounted or otherwise associated with the vehicle 124 and similarly equipped with position circuitry and an IMU. Additional, different, or fewer components may be included.

The vehicle sensors 113 generate data based on detecting the operation of the vehicle 124. The vehicle sensors 113 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. In addition, the vehicle sensor 113 may include a steering wheel angle sensor, a speedometer sensor, or a tachometer sensor. The mobile device 122 may generate vehicle commands based on data from the vehicle sensors 113 in combination with sign values described herein.

The environment sensors 111 generate data for identifying the surroundings and location of the car. The environment sensors 111 may include light detection and ranging (LIDAR), radar, pressure sensors, rain sensors, windshield wiper sensors, altimeter, barometers, lane sensors, proximity sensors, or other sensors. The mobile device 122 may identify likely weather (e.g. light rain, heavy rain, sun, snow, wind, or other weather features) or environmental conditions based on the data output of the environment sensors 111. The mobile device 122 may generate vehicle commands based on data from the environment sensors 111 in combination with sign values described herein.

Electronic Horizon

The false positive profile may be organized in a negative image electronic horizon. The electronic horizon describes upcoming false positive locations for a current route or current direction of travel. The electronic horizon refers to the collection of the road links and intersections leading out from a current vehicle position and false positives associated with those road links. The road links are potential driving paths of the vehicle from the current vehicle position. The electronic horizon may be limited to the current route or include all possible links reachable from the current link for a predetermined distance. The electronic horizon may include other data, including the road attributes, road objects, and road geometry of the road segments that form the electronic horizon. To calculate the electronic horizon, the location data indicating the vehicle's current position is used to query the database 123.

In one example for building an electronic horizon for all possible links, data for all of the road segments around the vehicle's current position is identified. A set of boundaries may be used to limit the size of the electronic horizon. The boundaries may be set so that the potential paths extending from the current vehicle position are sufficiently large so that the driver assistance programs are provided with all the data they may need to perform their functions, given the speed and direction of the vehicle as well as specific requirements of each of the driver assistance functions. On the other hand, boundaries for an electronic horizon may be set as small as possible in order to reduce the computational resources required to build it and also to reduce the computational resources required by the driver assistance programs.

Starting with the segment upon which the vehicle is currently located, each segment of each path leading away from the current vehicle position is evaluated for possible inclusion in the electronic horizon. The electronic horizon includes a path when the path has at least a minimum threshold cost or threshold distance.

In one example, the electronic horizon is represented by a tree from which the potential driving paths from the vehicle's current location diverge as branches. The tree that forms the electronic horizon includes components by which each point along each path can be specified and defined within the context of the entire tree structure. The tree may include a root node at the current position of the vehicle, a first segment for the road link of the root node, multiple internal nodes to which at least two links of the electronic horizon are attached, one or more exit links on which the vehicle may potential exit the current electronic horizon, and zero or more leaf nodes in which no further nodes are attached.

The electronic horizon may include positions of potential false positives. The potential false positives may be associated with a link or a node of the electronic horizon. A set of coordinates may describe the locations of the potential false positives. The set of coordinates may be measured with respect to the electronic horizon or from a location of a particular node in the electronic horizon. Alternatively, the set of coordinates may be global coordinates (e.g., longitude and latitude).

The server 125 or the mobile device 122 may select an electronic horizon including false positive positions based on a current position of the vehicle or a route being followed by the vehicle. The size of the electronic horizon may be a function of the speed of the vehicle, a speed limit value associated with the current link or a previous link, or a functional classification of the current link. The server 125 or the mobile device 122 may project likely progression of the vehicle and select the electronic horizon accordingly.

Figure 8:
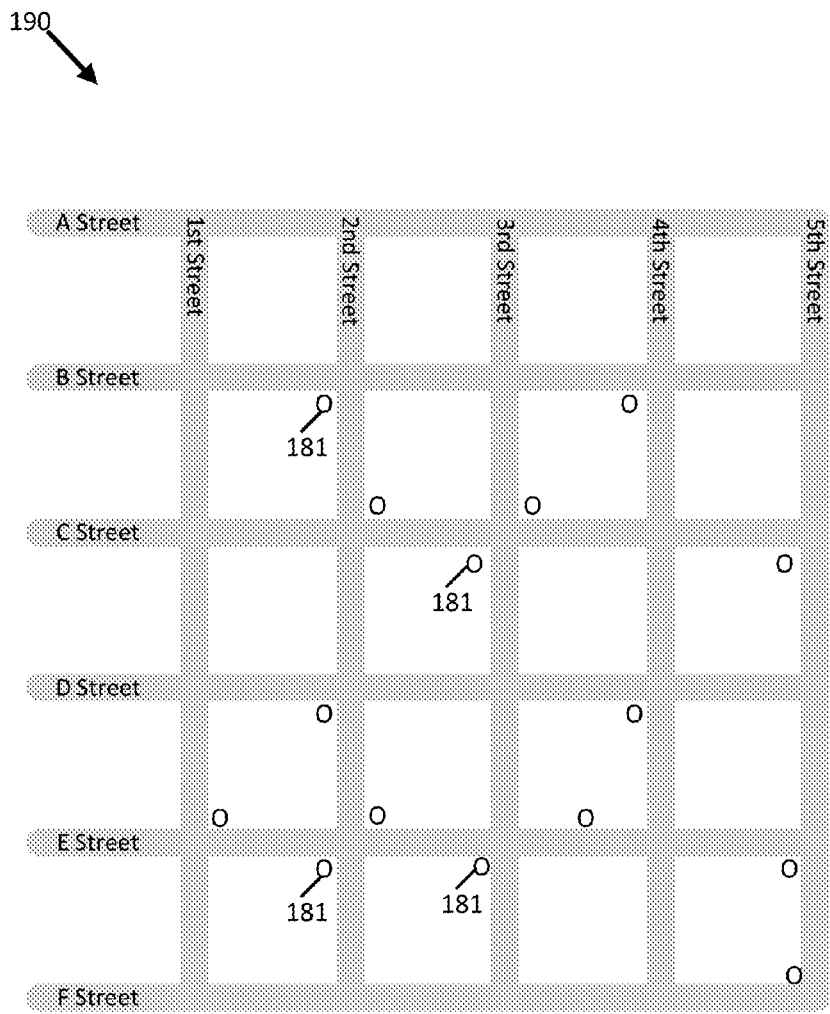
FIG. 8 illustrates an example map of sign locations.
Figure 9:
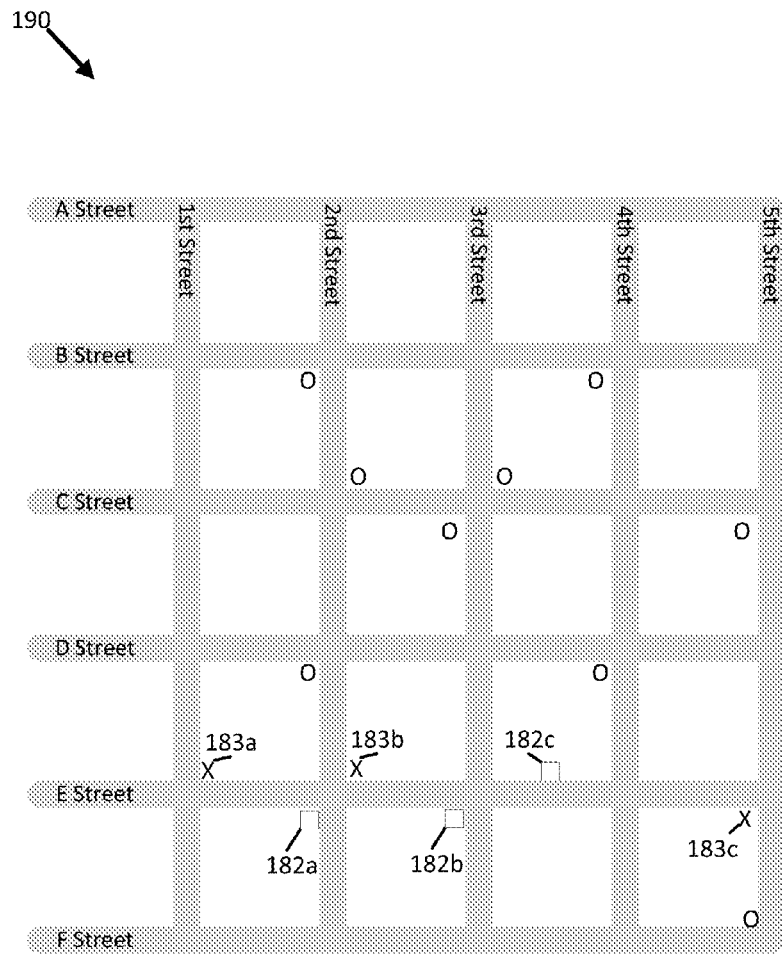
FIG. 9 illustrates an example scheme for determining potential false positives for sign placement in the map of FIG. 8.

FIG. 8 illustrates an example map 190 of sign locations 181. The sign locations 181 in FIG. 8 may include all sign locations for the map 190 in the database 123. FIG. 9 illustrates an example scheme for determining potential false positives for sign placement in the map of FIG. 8 in which false positive locations for one link are inferred from known sign locations on another link.

In one example, "E Street" is the current link that the vehicle is traveling on. The false positive profile for the current link may be based on sign positions for adjacent links. The mobile device 122 or server 125 may identify all of the links that intersect the current link and identify the sign locations for those links within a particular range of the current link. In the database 123, signs 182*a* and 182*b* are associated with E street. However, sign 183*a* is associated with First Street, sign 183*b* is associated with Second Street, and sign 183*c* is associated with Fifth Street. Therefore, the false positive profile for E street includes signs 183*a-c*. Other false positive profiles may be calculated in a similar manner for other links. For any two intersection links, the confirmed sign locations for a first link make up the false positive profile for a second link, and the confirmed sign locations for the second link make up the false positive profile for the first link.

Figure 10:
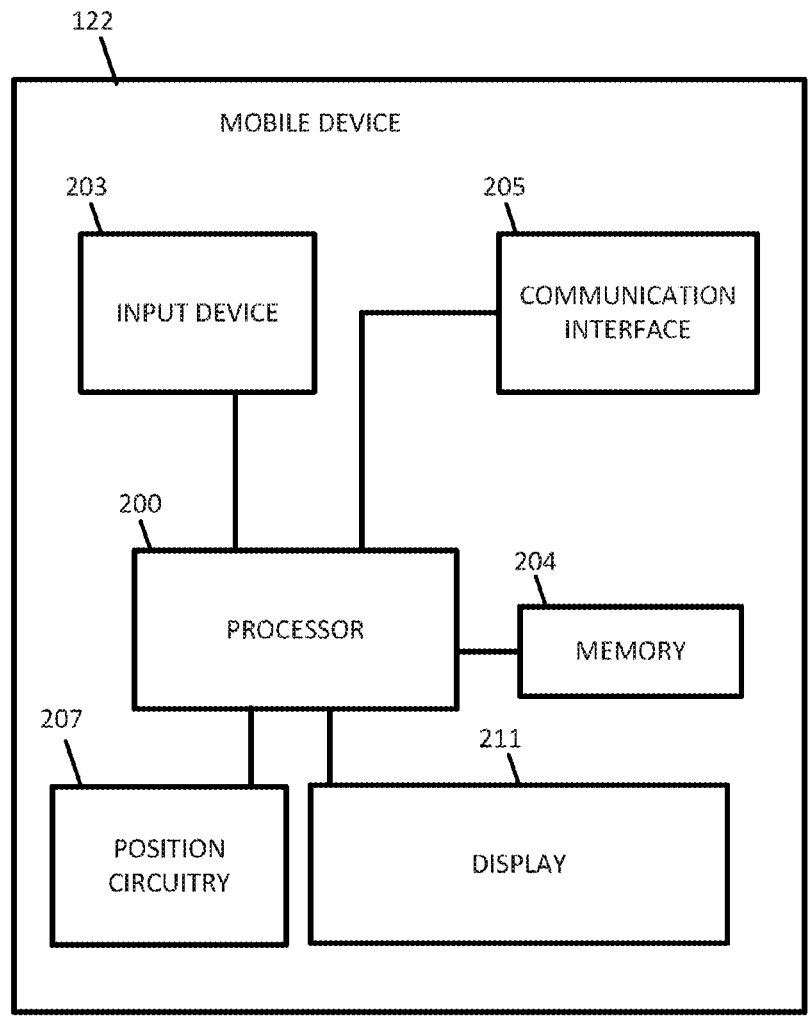
FIG. 10 illustrates an example mobile device for the system of FIG. 1.
Figure 11:
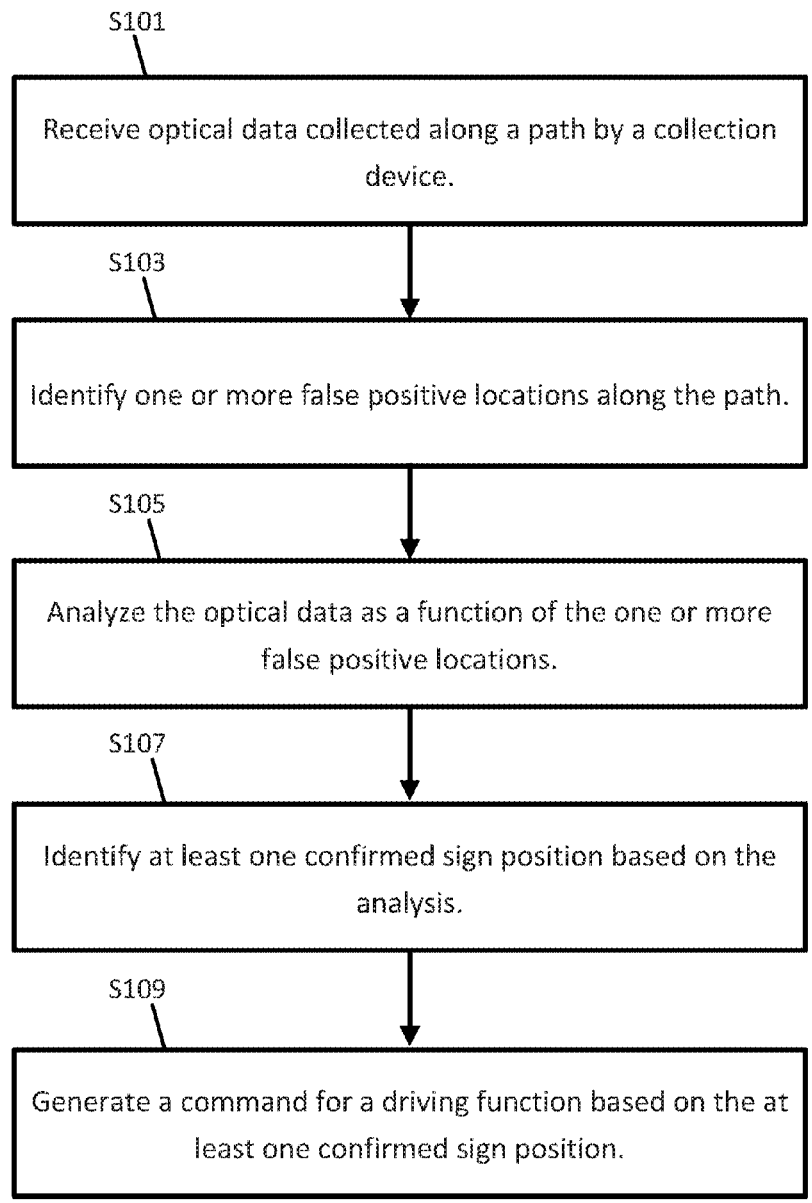
FIG. 11 illustrates an example flowchart for determining potential false positives for sign placement.

FIG. 10 illustrates an exemplary mobile device 122 of the system of FIG. 1. The mobile device 122 includes a processor 200, a memory 204, an input device 203, a communication interface 205, position circuitry 207, and a display 211. Additional, different, or fewer components are possible for the mobile device/personal computer 122. FIG. 11 illustrates an example flowchart for determining sign locations. The acts of FIG. 11 may be performed by the mobile device 122, an advanced driving assistance system (ADAS), a HAD device or an autonomous vehicle, any of which may be referred to as a computing device. The acts may be applied in a different order. Acts may be omitted or repeated. Additional acts may be added.

At act S101, the processor 200 or the communication interface 205 may be configured to receive optical data collected along a path by a collection device. The collection device may be a camera incorporated into mobile device 122. The collection device may be an external camera mounted on a vehicle or a helmet. The camera may collect images at a frame rate of 1 frame per second to 10 frames per second or another rate.

At act S103, the processor 200 identifies one or more false positive locations along the path from among the detected sign locations. The false positive locations may be listed in a false positive profile. The false positive profile may be retrieved locally from memory 204 or from database 123. The false positive profile may be retrieved based on a location of the mobile device 122 determined by the position circuitry 207. In one example, location data from the position circuitry 207 described a geographic position that is sent to database 123. A road segment is determined from the geographic position, and the false positive profile for the road segment is returned to the mobile device 122. Alternatively, map data such as locations of the one or more false positive locations along the road segment may be sent to the mobile device 122. The size or area covered by the map data may be variable. The size may be based on the speed of the vehicle or a function of a characteristic of the collection device. Example characteristics include range, focal length, and resolution.

At act S105, the processor 200 analyzes the optical data as a function of the one or more false positive locations. In one example, portions of the optical data within a predetermined distance from the one or more false positive locations are omitted from the analysis. In another example, one image processing algorithm is applied to optical data more than a predetermined distance from the one or more false positive locations, and another image processing algorithm is applied to the optical data that is within the predetermined distance from one or more false positive locations.

At act S107, the processor 200 identifies at least one confirmed sign position in the optical data. The confirmed sign positions may be sign positions that are not eliminated as false positive positions. Further image processing may interpret data from the signs at the confirmed sign positions. The data may be speed limit values, turn restrictions, curve warnings, ice warnings, or any data that may cause a driver to change the operation of a vehicle.

At act S109, the processor 200 generates a command for a driving function based on the at least one confirmed sign position. The driving function may be a speed warning or other informative message for the driver (e.g., curve approaching, bridge may be icy). The driving function may instruct the engine control unit of the vehicle to change the operation of the vehicle (e.g., increase accelerator, decrease accelerator, apply brake, turn, or other functions).

Figure 12:
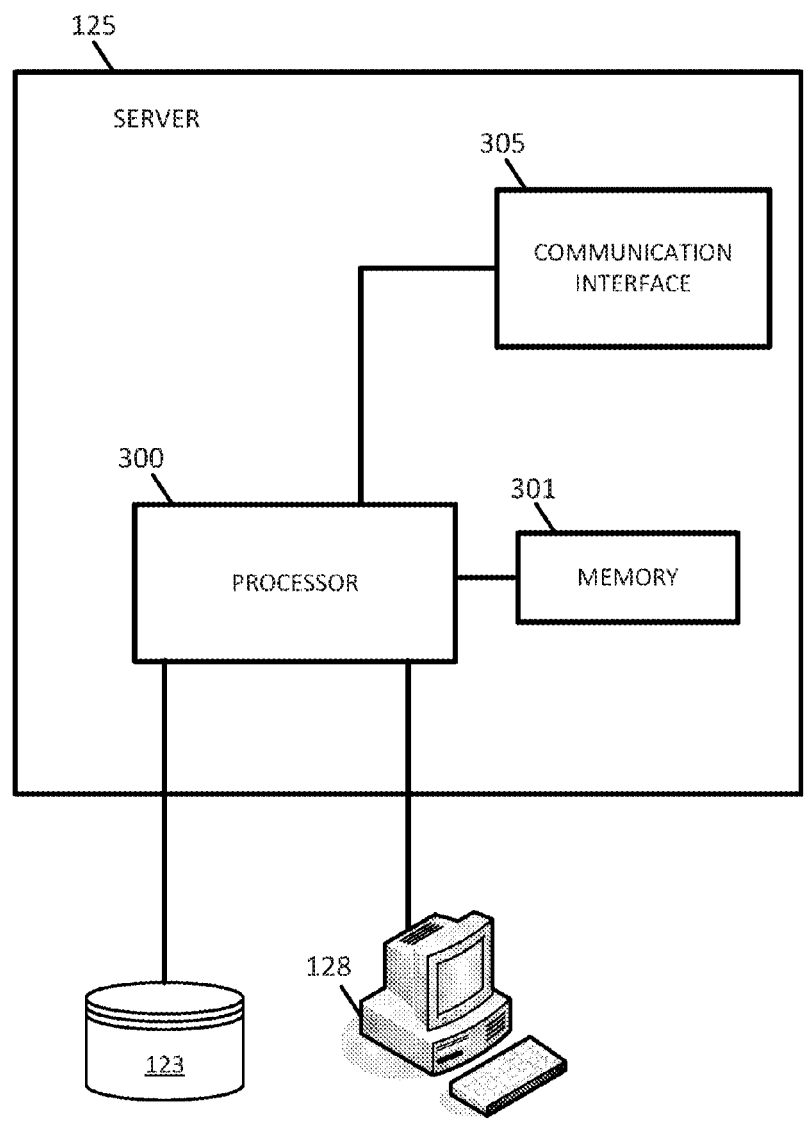
FIG. 12 illustrates an example network device of the system of FIG. 1.
Figure 13:
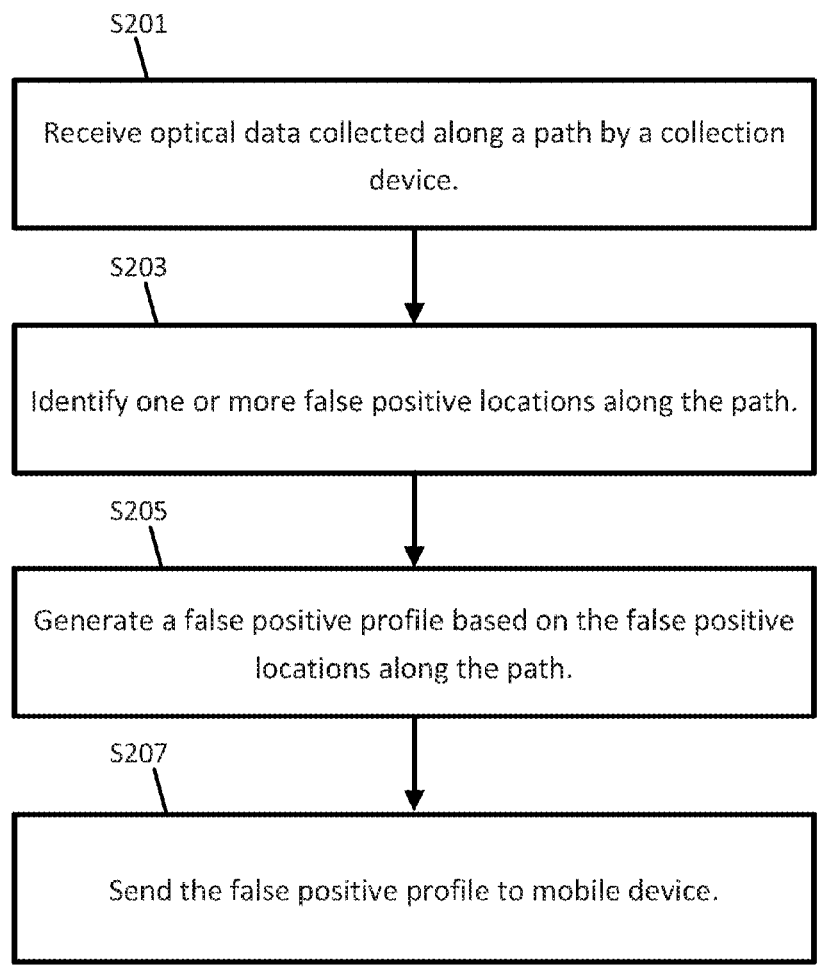
FIG. 13 illustrates an example flowchart for determining potential false positives for sign placement.

FIG. 12 illustrates an example network device (e.g., server 125) of the system of FIG. 1. The server 125 includes a processor 300, a communication interface 305, and a memory 301. The server 125 may be coupled to a database 123 and a workstation 128. The workstation 128 may be used as an input device for the server 125. In addition, the communication interface 305 is an input device for the server 125. In certain embodiments, the communication interface 305 may receive data indicative of user inputs made via the workstation 128 or the mobile device 122. FIG. 13 illustrates an example flowchart for identifying false positives in image data. The acts of the flowchart of FIG. 12 may alternatively be performed by the server 125 or another computing device. Different, fewer, or additional acts may be included.

At act S201, the processor 300 or communication interface 305 receives optical data collected along a path by a collection device. The optical data may be an image made of pixels. Subsets of pixels may be compared to sign templates through a window that is moved across the image data. The sign templates may describe expected sign shapes, colors, or other features in the images. Through, template matching, the processor 200 may identify one or more sign locations in the optical data. The sign locations are either actual sign locations of signs intended for the path segment that the image was collected from or false positive sign locations intended for other path segments.

At act S203, the processor 300 identified one or more false positive locations along the path. The false positives may be identified by image processing techniques. False positives may be signs at the wrong angle with respect to the road segment from which the image was collected or too far from the road segment. False positives may be identified by a human operator who enters data via the workstation 128.

At act S205, the processor 300 generates a false positive profile based on the false positive positions. The false positive profile may correspond to a road segment identifier received from the mobile device 122. The false positive profile may list locations along the road segment, a route including the road segment, or a larger area including the road segment. At act S207, the communication interface 305 sends the false positive profile to the mobile device 122.

Supporting Examples

The road link data records may be associated with attributes of or about the roads such as, for example, geographic coordinates, street names, address ranges, speed limits, turn restrictions at intersections, and/or other navigation related attributes (e.g., one or more of the road segments is part of a highway or tollway, the location of stop signs and/or stoplights along the road segments), as well as points of interest (PO's), such as gasoline stations, hotels, restaurants, museums, stadiums, offices, automobile dealerships, auto repair shops, buildings, stores, parks, etc. The node data records may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases 123 may be maintained by one or more map developers (e.g., the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel (e.g., the employees at the first company and/or the second company) to travel by vehicle along roads throughout the geographic region to observe features and/or record information about the features. Also, remote sensing such as, for example, aerial or satellite photography may be used.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The workstation 128 may be a general purpose computer including programming specialized for providing input to the server 125. For example, the workstation 128 may provide settings for the server 125. The settings may include verification of sign locations versus false positive locations. The settings may include a size for a minimum bounding box or predetermined distance for excluding the false positive locations from future analysis. The workstation 128 may include at least a memory, a processor, and a communication interface.

The size of the bounding box or predetermined distance for excluding false positive locations may be selected based on a speed of the vehicle or the functional classification of the current road link or future road links. Table 2 lists example classification systems that may be assigned numeric values for functional class. The functional class of the road segment may be described as a numerical value (e.g., 1, 2, 3, 4, and 5) represented in the feature vector. Functional class 1 may be highways while functional class 5 may be small streets. Table 2 further illustrates schemes having three to six functional classes.

TABLE 2

| Simple System | Complex System | U.S. Long Distance Roads | Highway Tags |
| --- | --- | --- | --- |
| Arterial Road | Interstates | Interstate Expressway | Motorway |
| Collector Road | Principal Arteries | Federal Highway | Trunk |
| Local Road | Minor Arteries | State Highway | Primary |
| | Major Collector | County Highway | Secondary |
| | Minor Collector | Local Road | Tertiary |
| | Local Road | | Residential |

One example of a simple system includes the functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

An example of a complex functional classification system is the urban classification system. Interstates include high speed and controlled access roads that span long distances. The arterial roads are divided into principle arteries and minor arteries according to size. The collector roads are divided into major collectors and minor collectors according to size. Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads.

The computing device processor 200 and/or the server processor 300 may include a general processor, digital signal processor, an application specific integrated circuit (ASIC), field programmable gate array (FPGA), analog circuit, digital circuit, combinations thereof, or other now known or later developed processor. The mobile device processor 200 and/or the server processor 300 may be a single device or combinations of devices, such as associated with a network, distributed processing, or cloud computing. The computing device processor 200 and/or the server processor 300 may also be configured to cause an apparatus to at least perform at least one of methods described above.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   receiving sensor data optically collected along a path by a collection device;
   identifying one or more false positive locations for one or more signs associated with the path;
   identifying a potential position from the sensor data;
   comparing the potential position to the one or more false positive locations; and
   analyzing the sensor data based on the one or more false positive locations to identify the potential position as a confirmed position in response to a distance between the potential position and at least one of the one or more false positive locations exceeding a threshold distance.

2. The method of claim 1, further comprising:
   modifying the identified potential position in response to the distance between the potential position and the at least one of the one or more false positive locations being less than the threshold distance.

3. The method of claim 1, wherein analyzing the sensor data based on the one or more false positive locations comprises:
   defining a bounding box for the sensor data according to the one or more false positive locations.

4. The method of claim 3, further comprising:
   blocking analysis of the sensor data in the bounding box.

5. The method of claim 3, further comprising:
   generating a warning message indicative of a risk of false positives based on the bounding box.

6. The method of claim 3, further comprising:
   increasing the threshold distance for the bounding box.

7. The method of claim 1, further comprising:
   receiving a set of map data including the one or more false positive locations along the path.

8. A method comprising:
   receiving sensor data optically collected along a path by an autonomous vehicle;
   identifying one or more false positive locations for one or more signs associated with the path;
   identifying a potential position from the sensor data;
   comparing the potential position to the one or more false positive locations;
   analyzing the sensor data based on the one or more false positive locations to confirm the potential position as a confirmed position; and
   generating a command for the autonomous vehicle in response to the confirmed position.

9. The method of claim 8, wherein the command includes data indicative of a road sign for the path.

10. The method of claim 8, wherein the command is a speed warning.

11. The method of claim 8, wherein the command is a command for operation of the autonomous vehicle.

12. The method of claim 8, wherein analyzing the sensor data based on the one or more false positive locations comprises:
    defining a bounding box for the sensor data according to the one or more false positive locations.

13. The method of claim 12, further comprising:
    blocking analysis of the sensor data in the bounding box.

14. The method of claim 12, further comprising:
    generating a warning message indicative of a risk of false positives based on the bounding box.

15. The method of claim 12, further comprising:
    increasing the size for the bounding box.

16. A method comprising:
    identifying a path;
    identifying a potential position from sensor data optically collected along the path by a collection device;
    performing a comparison of the potential position to a threshold value with respect to the path;
    identifying the potential position as a false positive location for a sign based on the comparison; and
    storing data indicative of the false positive location in a geographic database.

17. The method of claim 16, wherein the threshold value is a threshold distance between the potential position and the path.

18. The method of claim 16, wherein the threshold value is an orientation angle threshold for the potential position.

19. The method of claim 16, further comprising:
    defining a bounding box for the sensor data according to the false positive location; and
    storing the bounding box in the geographic database.

20. The method of claim 16, wherein the threshold value includes an angle, position, or orientation of a sign detected in the optical data.

* * * * *